United States Patent [19]

Barcza

[11] Patent Number: 5,261,606
[45] Date of Patent: Nov. 16, 1993

[54] CROSSED STRUT DIVERGENT FLAP VECTORING MECHANISM

[75] Inventor: William K. Barcza, Stuart, Fla.

[73] Assignee: United Technologies Corporation, Hartford, Conn.

[21] Appl. No.: 966,482

[22] Filed: Oct. 26, 1992

[51] Int. Cl.⁵ .............................................. B64C 15/02
[52] U.S. Cl. .................................. 239/265.35; 60/232
[58] Field of Search ............... 239/265.35, 265.19, 239/265.39, 265.41; 60/230-232

[56] References Cited

U.S. PATENT DOCUMENTS

| | | |
|---|---|---|
| 512,833 | 11/1892 | Lippmeier .......................... 60/232 |
| 3,436,021 | 4/1969 | Walton et al. ................. 239/265.35 |
| 4,994,660 | 2/1991 | Hauer ......................... 239/265.35 X |
| 5,082,182 | 1/1992 | Bruchez et al. ................. 239/265.35 |
| 5,102,050 | 4/1992 | Sedziol et al. ................. 239/265.35 |

*Primary Examiner*—Andres Kashnikow
*Assistant Examiner*—Kevin P. Weldon
*Attorney, Agent, or Firm*—Christopher T. Hayes

[57] ABSTRACT

A divergent flap assembly having a divergent flap connected to a sync-ring by first and second divergent struts that cross adjacent the center portions thereof providing a linkage arrangement that produces a uniform vectoring of all of the divergent flaps for a given angle of rotation of the sync-ring about the center thereof.

7 Claims, 5 Drawing Sheets

5,261,606

CROSSED STRUT DIVERGENT FLAP VECTORING MECHANISM

FIELD OF THE INVENTION

This invention relates to exhaust nozzles for gas turbine engines.

BACKGROUND ART

One of the goals of designers of high performance gas turbine aircraft engines has been to achieve thrust vectoring exhaust nozzles. While this goal has been somewhat achieved through the use of "two-dimensional" nozzles, such nozzles are substantially heavier and more expensive than the variable exit area axisymmetric nozzles that they are intended to replace. Heretofore designers have been unable to produce thrust vectoring from an axisymmetric exhaust nozzle without significantly increasing the cost and weight of the axisymmetric nozzle, as well as the complexity thereof.

What is needed is a mechanism to provide selective positioning of the divergent flaps of an axisymmetric exhaust nozzle to produce thrust vectoring without significantly increasing the weight and complexity thereof.

DISCLOSURE OF THE INVENTION

According to the present invention, the foregoing and other objects are attained by providing a plurality of divergent vectoring flap assemblies which selectively position the divergent flaps. Each assembly includes divergent struts that position a divergent flap by rotating the flap about two rotational axes which are perpendicular to each other. Each strut extends between one of the divergent flaps and a sync-ring that is movable both in translation and rotation relative to the divergent flaps. The struts of each assembly cross, thereby causing the divergent flap of the respective assembly to rotate about one axis of the assembly that is offset from the sync-ring when the sync-ring rotates, the offset axis causing the respective divergent flap to rotate through a greater angle of rotation than the angle of rotation of the sync-ring.

The foregoing and other features and advantages of the present invention will become more apparent from the following description and accompanying drawings.

BEST MODE FOR CARRYING OUT THE INVENTION

Figure 1:
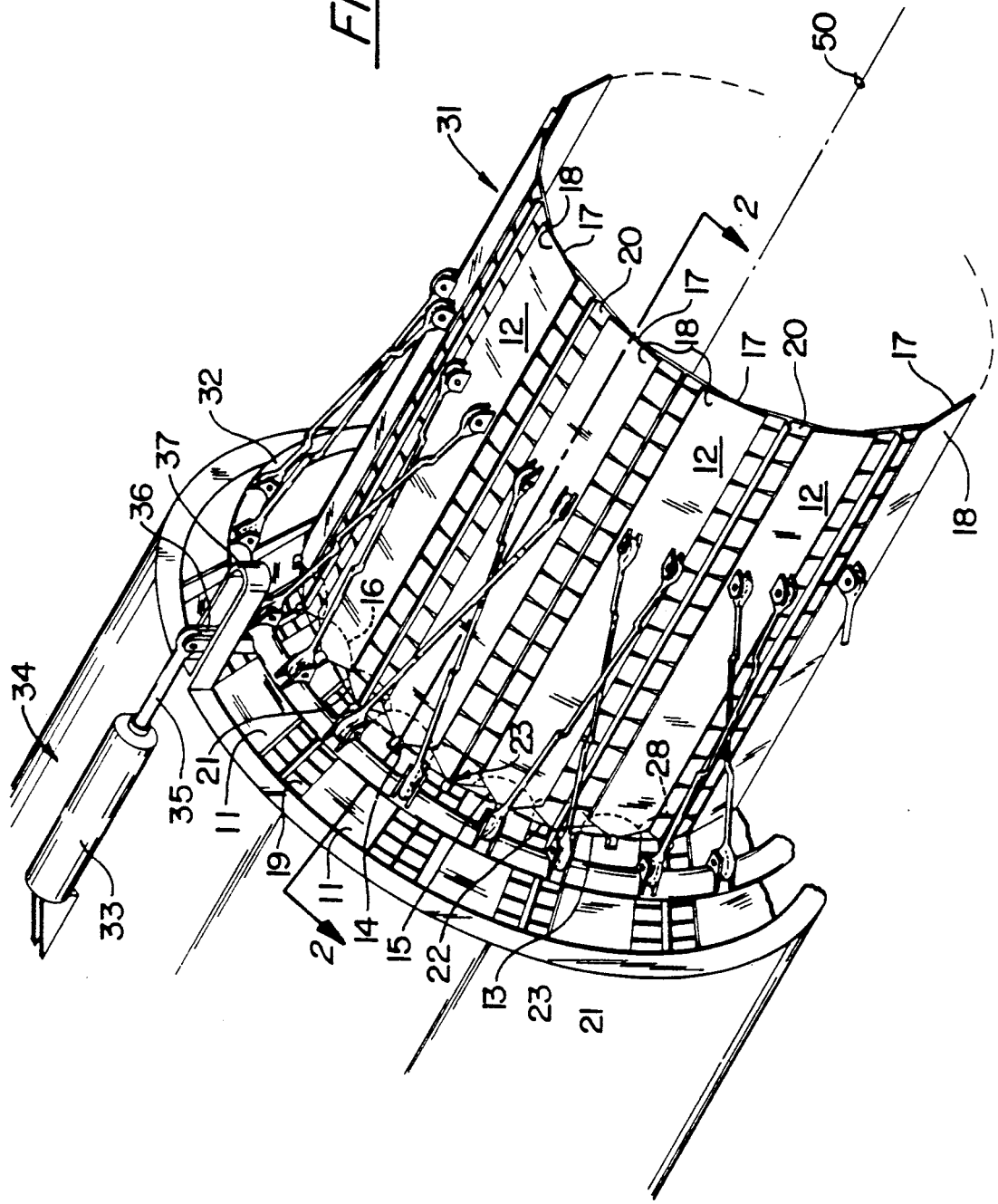
FIG. 1 is a partial isometric view of a convergent/divergent nozzle incorporating the present invention.

FIG. 1 shows a convergent/divergent nozzle 10 incorporating convergent flaps 11 with elongated divergent flaps 12 pivotally attached to the trailing edge 13 thereof by a divergent flap hinge 14 at the leading edge 15 of the divergent flap 12. The convergent/divergent flap assembly includes a flap hinge seal 16 which overlays the hinge 14 to prevent the escape of the exhaust gas of the gas turbine engine at the hinge 14. Each of the divergent flaps 12 has a gas side 17 and an air side 18. As used herein, the term "gas side" refers to the surface of the respective component that is exposed to the exhaust gas of the engine, and the term "air side" refers to the surface of the component opposite the gas side.

A convergent seal 19 is located between each pair of adjacent convergent flaps 11 and a divergent seal 20 is likewise positioned between each pair of adjacent divergent flaps 12 in sealing contact with the gas side 17 thereof. The leading edge 21 of each divergent seal 20 is pivotally connected to the trailing edge 22 of the convergent seal 19 immediately upstream therefrom by a seal hinge 23 and a seal hinge seal 28 overlays the seal hinge 23 to prevent the escape of exhaust gas at the seal hinge 23.

The throat area of the nozzle is controlled by the convergent flaps 11 through the "balanced beam" arrangement known in the art and disclosed in U.S. Pat. No. 5,082,182 referenced above. The exhaust area and thrust vectoring are controlled as follows. Each of the divergent flaps 12 is part of a divergent flap assembly 31 which is pivotally connected to the sync-ring 32. Three actuators 33 (only one shown in FIG. 1) are mounted to the engine case 34 at 120° intervals. The arm 35 of each actuator 33 is pivotally connected to a sync-ring bracket 36 which is slidably received within a guide 37 fixedly secured to the engine case 34. From the foregoing description, those skilled in the art will readily appreciate that if the actuators 33 act symmetrically on the sync-ring 32, the sync-ring 32 translates along the axis 50 of the nozzle 10, thereby increasing or decreasing the exhaust area of the nozzle 10. If, however, the actuators 33 act asymmetrically on the sync-ring 32, the sync-ring 32 tilts, the divergent flaps 12 are positioned asymmetrically, and the exhaust gas discharge from the engine is vectored in a direction which is not perpendicular to the throat plane of the nozzle 10.

Figure 2:
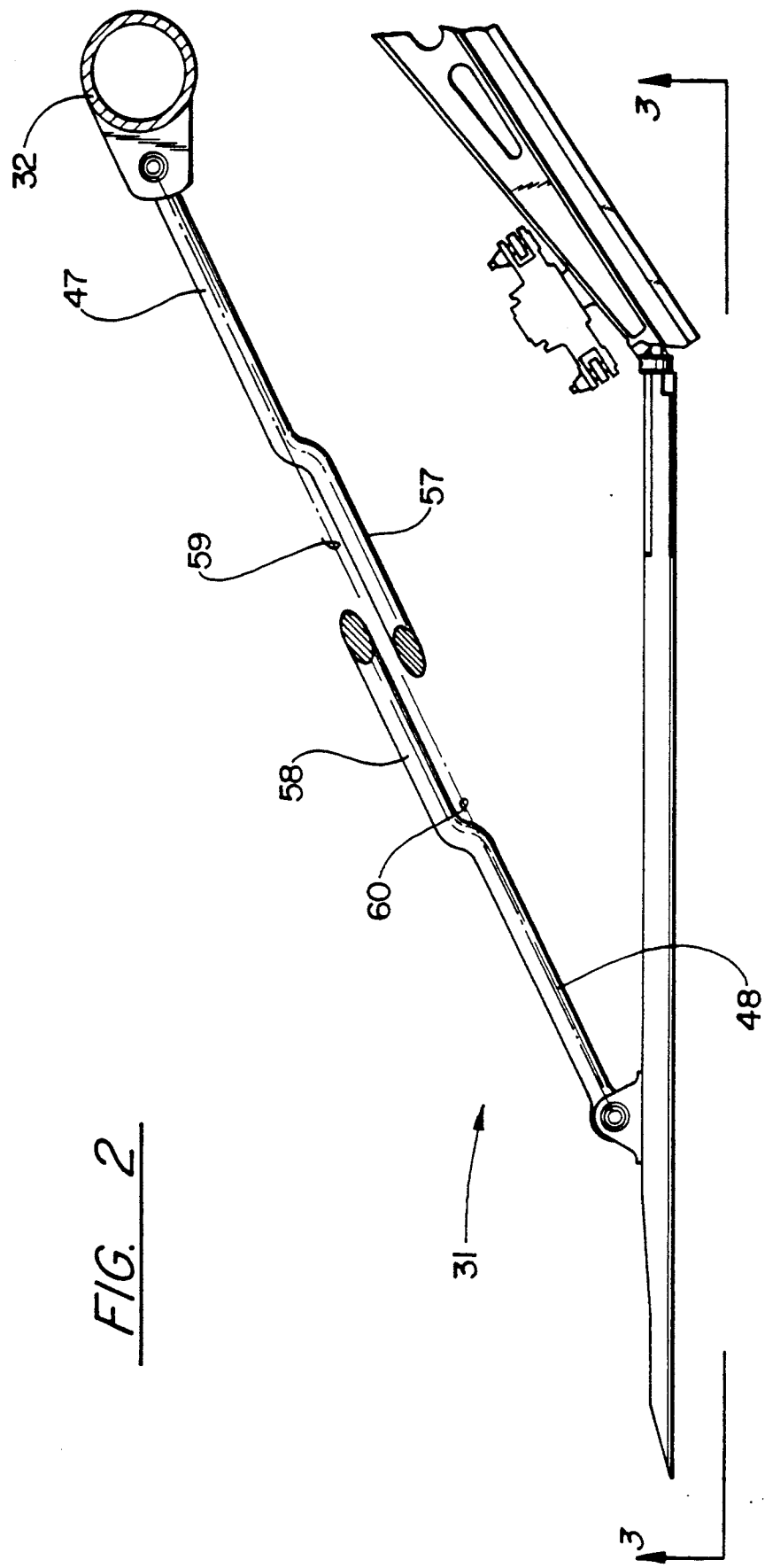
FIG. 2 is a sectional view of the divergent flap assembly of the present invention taken along line 2—2 of FIG. 1.
Figure 3:
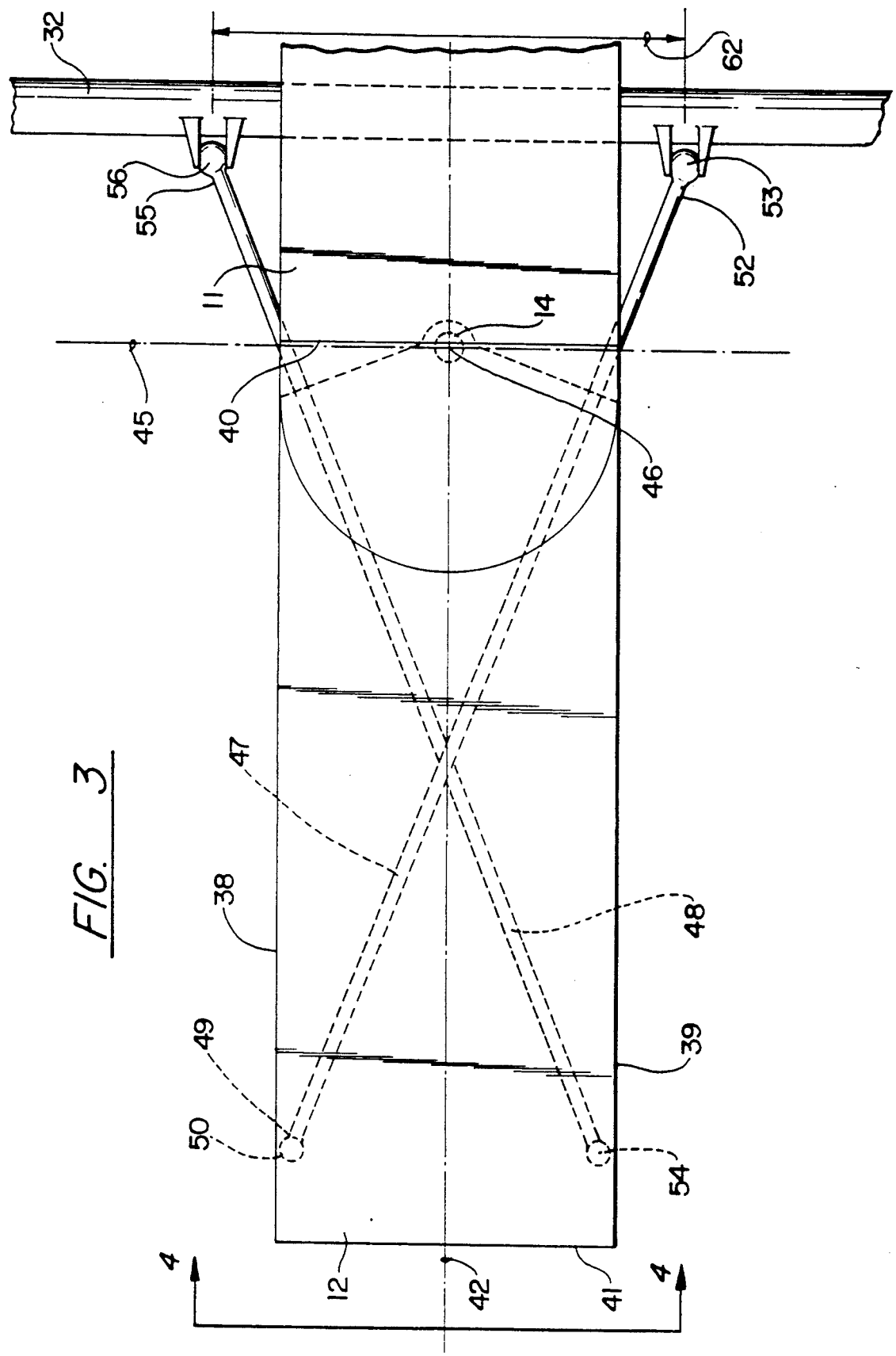
FIG. 3 is a plan view taken along line 3—3 of FIG. 2 and showing the divergent struts in phantom lines.
Figure 4:
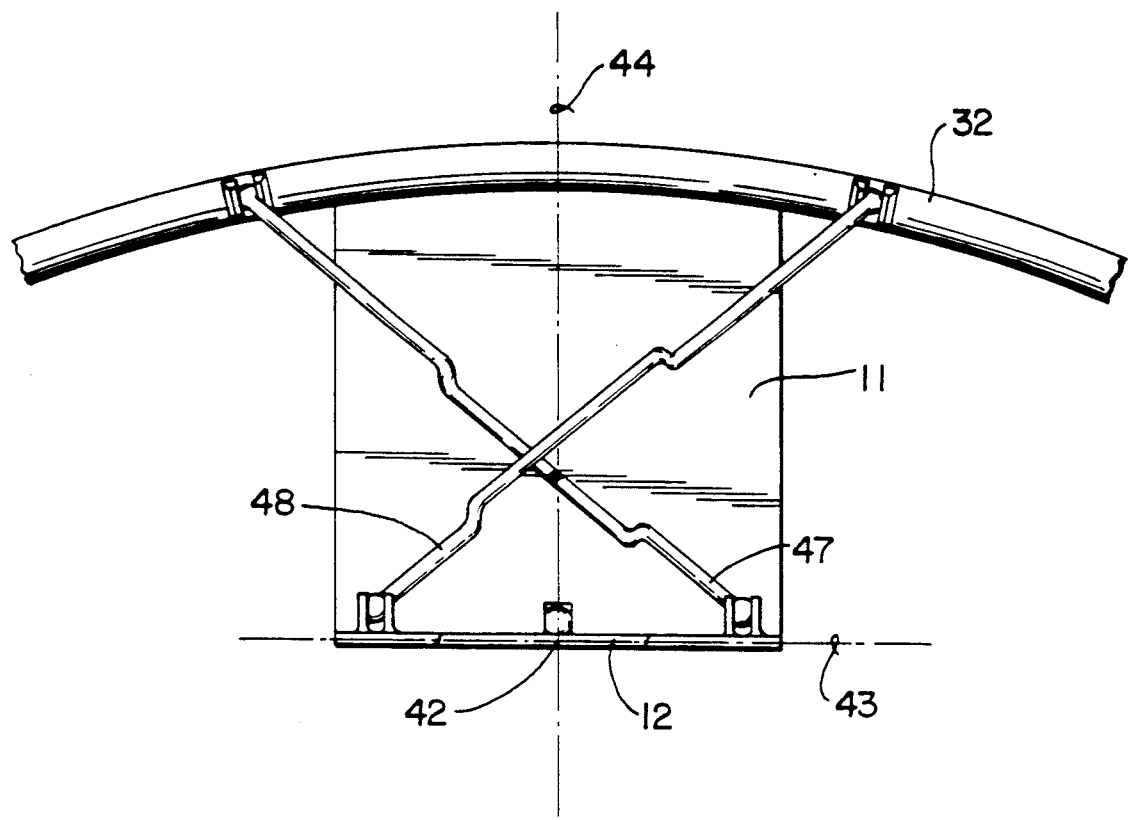
FIG. 4 is an end view of the divergent flap assembly taken along line 4-4 of FIG. 3.

The nozzle 10 includes a plurality of divergent flap assemblies 31, one of which is shown in cross-section in FIG. 2. Each divergent flap assembly 31 includes a divergent flap 12 having first 38 and second 39 longitudinally extending edges, each edge 38, 39 extending between a first end 40 and a second end 41 of the divergent flap as shown in FIG. 3. The first end 40 of the divergent flap 12 is pivotally connected to one end of one of the convergent flaps 11 of the convergent/divergent nozzle 10 by the divergent flap hinge 14, which is a multi-axis joint, such as a universal joint. The divergent flap 12 has a longitudinal axis 42 extending therethrough and the longitudinal axis intersects the multi-axis joint 14. Each of the first 38 and second 39 edges is equidistant from the longitudinal axis 42, and the first 38 and second 39 edges define a base plane 43 as shown in FIG. 4. The longitudinal axis lies entirely within a reference plane 44 that is perpendicular to the base plane 43.

Each divergent flap is rotatable about first 45 and second 46 axes of rotation, as shown in FIG. 3. The first axis of rotation 45 is perpendicular to the reference plane 44 and extends through the joint 14, and the second axis of rotation 46 is perpendicular to the base plane 43 and likewise extends through the joint 14.

Each of the divergent flap assemblies 31 includes two divergent struts 47, 48 that connect the divergent flap 12 to the sync-ring 32. One end 49 of the first strut 47 is pivotally connected, preferably by a spherical bearing 50, to the divergent flap 12 adjacent the first edge 38 and adjacent the second end 41. The opposite end 52 of the first divergent strut 47 is pivotally connected to the sync-ring 32, also by a spherical bearing 53. The second strut 48 is likewise pivotally connected by a spherical bearing 54 to the divergent flap 12 adjacent the second edge 39 and adjacent the second end 41. The opposite end 55 of the second divergent strut 48 is pivotally connected to the sync-ring 32, also by a spherical bearing 56.

As shown in FIG. 4, the first 47 and second 48 divergent struts are crossed, such that each of the struts 47, 48 intersects the reference plane 44 and, when viewed in the plan view of FIG. 3, each strut 47, 48 extends in a generally diagonal fashion across the divergent flap 12. As those skilled in the art will readily appreciate from the discussion below, this crossing of the first and second struts 47, 48 is critical to the operation of the present invention. The first and second struts 47, 48 are able to cross without interference therebetween because each strut 47, 48 includes a center portion 57, 58 that is offset from the axes 59, 60 of the respective strut 47, 48, as shown in FIG. 2. The offset center portion 57 of the first strut 47 cooperates with the offset center portion 60 of the second strut 48, such that the offset portions 57, 58 overlap one another but do not contact. Of course, the length of each of the offset center portions 57, 58 is adequate to ensure that the first and second struts 47, 48 do not interfere with each other even when the divergent flap 12 is at its fully lateral position, as discussed below. The first strut 47 and the second 48 are the same length, and may even be identical, with one strut 47 being inverted with respect to the other strut 48 on a given divergent flap assembly 31.

The first divergent strut 47 is connected to the divergent flap 12 at a first point that is at a first distance from the joint 14, and the second divergent strut 48 is connected to the divergent flap 12 at a second point that is at a second distance from the joint 14. The length of the first divergent strut 47 is greater than the first distance, and the length of the second divergent strut 48 is greater than the second distance. Additionally, the second axis of rotation 46 is offset from the sync-ring 32 and lies between the sync-ring 32 and the respective divergent flap 12, for the reason discussed below.

Figure 5:
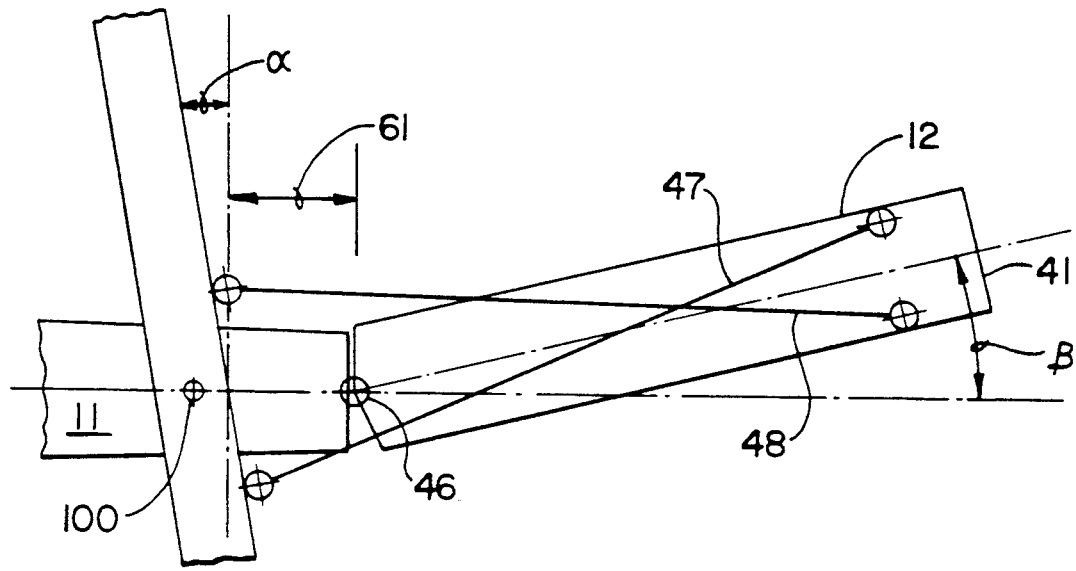
FIG. 5 schematically shows the linkage effect of the present invention on a divergent flap assembly at a twelve o'clock position during a vectored nozzle condition.
Figure 6:
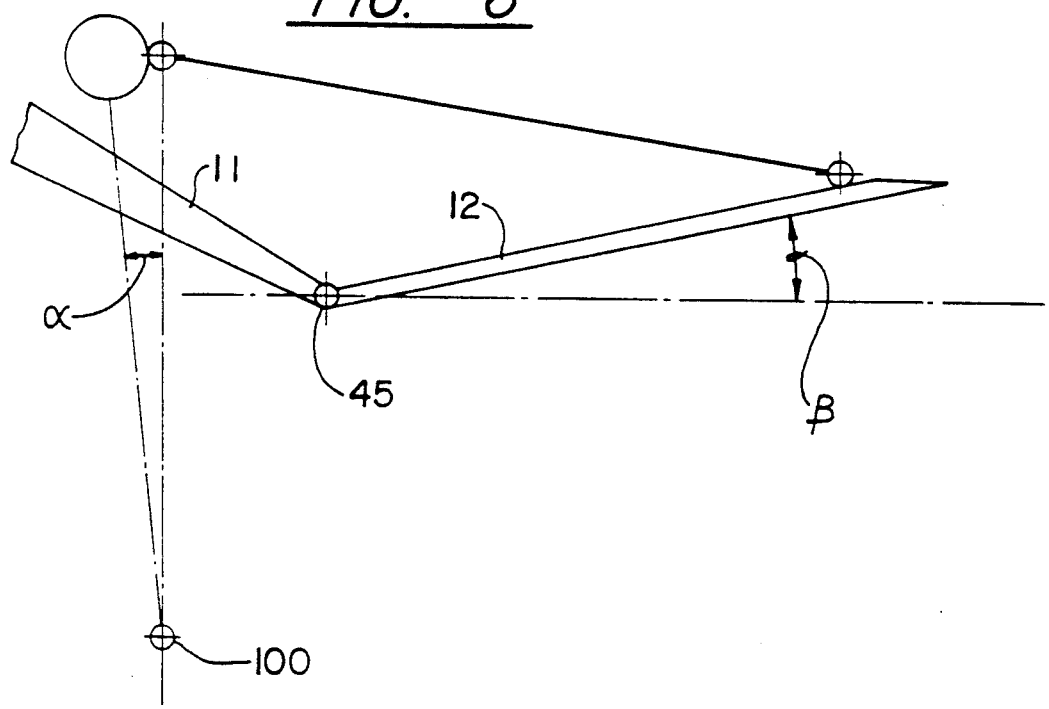
FIG. 6 schematically shows the linkage effect of the present invention on a divergent flap assembly at a nine o'clock position during the vectored nozzle condition of FIG. 5.

By rotating or tilting the sync-ring 32 about the center 100 thereof an angle $\alpha$ as shown schematically in FIGS. 5 and 6, the second end 41 of the divergent flap 12 is displaced laterally as a result of the divergent flap 12 being rotated about the second axis 46 of the respective divergent flap assembly 31. As those skilled in the art will readily appreciate, because the second axis 46 is offset from the sync-ring 32, the divergent flap 12 must rotate about the second axis 46 through an angle $\beta$ greater than $\alpha$ because the struts 47, 48 fix the position and orientation of the second end 41 of each divergent flap 12 relative to the sync-ring 32. As the offset distance 61 between the second axis 46 and the sync-ring 32 increases, the angle $\beta$ through which the divergent flap 12 must rotate increases. Thus, the offset 61 between the sync-ring 32 and the second axis 46 of each divergent flap assembly 31 produces a multiplying effect between the tilt of the sync-ring 32 and the lateral rotation of the divergent flap 12 about the second axis 46.

In operation, the throat area of the nozzle 10 is controlled by the convergent section of the convergent/divergent nozzle in the manner known in the prior art. The divergent section is controlled by the position and orientation of the sync-ring 32. If the sync-ring 32 translates without tilting, each divergent flap 12 symmetrically rotates about the first axis 45 thereof, thereby increasing or decreasing the exhaust area of the nozzle 10. If, on the other hand, the sync-ring 32 tilts, each of the divergent flaps will rotate in the direction of the tilt about the first axis 45 thereof, the second axis 46 thereof, or a combination of both, thus vectoring exhaust gas passing through the nozzle 10 in the general direction of the tilt.

As those skilled in the art will readily appreciate, in order for the nozzle exhaust area to remain substantially round (as opposed to oval) when the nozzle 10 is in the vectored exhaust position, each of the divergent flaps 12 must rotate through the same angle. It is particularly desirable that the divergent section of the nozzle 10 remain round when the nozzle throat area is at a minimum, since at this condition the divergent flaps 12 are relatively crowded together and unless all of the divergent flaps 12 swing in the same direction and through approximately the same angle, adjacent divergent flaps 12 will interfere with one another. As those skilled in the art will readily appreciate, for a given tilt angle $\alpha$ of the sync-ring 32 that rotates the divergent flap 12 at the twelve o'clock position solely about the first axis 45 thereof through an angle $\beta$, as shown in FIG. 6, the angle through which a divergent flap 12 at the nine o'clock position rotates solely about the second axis 46 thereof, as shown in FIG. 5, can be adjusted by varying the distance 62 between the spherical bearings 53, 56 of the first and second struts 47, 48 of the divergent flap 12 at the nine o'clock position without significantly affecting the relationship between the tilt angle $\alpha$ and rotation of the divergent flap 12 about the first axis 45.

Additionally, the distance at which the second axis 46 is offset from the sync-ring 32 can be adjusted to vary the relationship between the tilt angle $\alpha$ of the sync-ring 32 and the resultant angle $\beta$ through which a given divergent flap 12 rotates about the second axis 46 thereof. It is to be understood from the foregoing discussion that regardless of the offset distance 61 of the second axis 46, the spacing 62 between the spherical bearings 53, 56 that connect the first and second struts 47, 48 to the sync-ring 32, each of the divergent flap assemblies 31 is the same as the other divergent flap assemblies 31, each divergent flap assembly 31 being interchangeable with the others without altering the operation of the nozzle.

Although this invention has been shown and described with respect to a detailed embodiment thereof, it will be understood by those skilled in the art that various changes in form and detail thereof may be made without departing from the spirit and scope of the claimed invention.

I claim:

1. A divergent flap positioning assembly for selectively positioning divergent flaps of a convergent/divergent axisymmetric gas turbine engine exhaust nozzle, said assembly comprising:

a sync-ring rotatably secured within said nozzle; and,
a plurality of divergent flap assemblies, each divergent flap assembly including
an elongated divergent flap having first and second longitudinally extending edges, said first and second edges extending between a first end and a second end of the divergent flap, said first end of the divergent flap pivotally connected to a convergent flap at a multi-axis joint, said first and second edges equidistant from a longitudinal axis extending through said divergent flap and through said multi-axis joint, said first and second edges defining a base plane, said longitudinal axis located entirely within a reference plane perpendicular to said base plane,
a first divergent strut having one end thereof pivotally connected to said divergent flap adjacent said first edge and another end of the first divergent strut pivotally connected to said sync-ring, said first divergent strut intersecting said reference plane, and
a second divergent strut having one end thereof pivotally connected to said divergent flap adjacent said second edge and another end of the second divergent strut pivotally connected to said sync-ring, said second divergent strut intersecting said reference plane.

2. The divergent flap assembly of claim 1 wherein said divergent flap is rotatable about first and second axes of rotation, said first axis of rotation perpendicular to said reference plane and extending through said joint, and said second axis of rotation perpendicular to said base plane and extending through said joint.

3. The divergent flap assembly of claim 2 wherein the first and second struts are connected to the divergent flap adjacent the second end thereof.

4. The divergent flap assembly of claim 3 wherein the first divergent strut is connected to the divergent flap at a first point that is at a first distance from the joint, the second divergent strut is connected to the divergent flap at a second point that is at a second distance from the joint, the length of the first divergent strut is greater than said first distance, and the length of the second divergent strut is greater than said second distance.

5. The divergent flap assembly of claim 4 wherein said first strut is the same length as said second strut.

6. The divergent flap assembly of claim 5 wherein said joint is a universal joint.

7. A divergent flap positioning assembly for selectively positioning divergent flaps of a convergent/divergent axisymmetric gas turbine engine exhaust nozzle, said assembly comprising:
a sync-ring having a center and rotatably secured within said nozzle; and,
a plurality of divergent flap assemblies, each divergent flap assembly including
an elongated divergent flap having first and second longitudinally extending edges, said first and second edges defining a reference plane, each point in the reference plane equidistant from said first and second edges,
a first divergent strut having one end thereof pivotally connected to said divergent flap adjacent said first edge and another end of the first divergent strut pivotally connected to said sync-ring, said first divergent strut intersecting said reference plane, and
a second divergent strut having one end thereof pivotally connected to said divergent flap adjacent said second edge and another end of the second divergent strut pivotally connected to said sync-ring, said second divergent strut intersecting said reference plane.

* * * * *